:# 2,870,154
CATALYST DEHYDROGENATION PROCESS

Emory W. Pitzer, Bartlesville, Okla., assignor to Phillips Petroleum Company, a corporation of Delaware No Drawing. Application August 2, 1956
Serial No. 601,624

14 Claims. (Cl. 260—290)

This invention relates to catalysts. In another aspect, it relates to a dehydrogenation process utilizing such catalysts.

In the catalytic dehydrogenation of monoolefins, alkylpyridines, and alkyl aromatics to produce diolefins, alkenylpyridines and alkenyl aromatics, respectively, hereafter referred to as specified dehydrogenation reactions, catalyst materials have been developed which are self-regenerating when the reactant mixtures are admixed with steam so that the operation can be carried out in a continuous manner without periodic regeneration.

A typical catalyst is an iron oxide catalyst containing a small amount of chromium oxide as a stabilizer and a small amount of potassium oxide as a promoter. Definite improvements upon this catalyst as to selectivity have been made, for example, as described in my copending application, Serial Number 531,026, filed August 29, 1955, now abandoned, entitled "Catalyst and Dehydrogenation Process." The aforementioned typical catalyst is also deficient in physical strength. While physical strength is a factor which is difficult to measure quantitatively, it is observed, upon removing such typical catalyst from a dehydrogenation reactor after a sustained period of operation, that there is considerable crumbling and powdering of the catalyst. In other words, considerable attrition occurs during the use of the catalyst.

In accordance with this invention, a catalyst is provided which is far less subject to crumbling and powdering, and which resists attrition to a considerably greater degree than the aforementioned typical iron oxide-chromium oxide-potassium oxide catalyst. This is accomplished by utilizing, as catalyst in the specified dehydrogenation reactions, 10 to 60 percent potassium fluoride, 0.2 to 5 percent chromium fluoride, and the balance iron fluoride. Such catalysts are oftentimes more selective in effecting the desired conversion than previous catalysts and, upon observation of the catalyst after it is removed from the catalyst case after dehydrogenation therewith for a substantial period, the catalyst of the invention is considerably less crumbled and powdered that the aforementioned iron oxide-chromium oxide-potassium oxide catalyst, the difference in this respect being readily noted by an observer upon unloading the catalyst.

The greatest improvement is noted with catalysts having a more restricted range of compositions both as to improvement in selectivity and physical strength of the catalyst. This more restricted range is defined as 30 to 55 percent by weight potassium fluoride, 2 to 5 percent by weight chromium fluoride, and the balance iron fluoride.

The concept of a multicomponent dehydrogenation catalyst formed entirely from fluorides is novel with me, so far as is known.

Numerous methods for preparing this catalyst are available. For example, the catalyst components may be brought together in a mill, such as a hammer mill, and milled to break up the agglomerates to small size, the milled mixture pelleted and dried, and the catalyst used in the dehydrogenation process. Alternatively, the catalyst components can be formed into a paste with any suitable liquid, such as water or a dilute tannic acid solution, and extruded into any desired shape or size. Other methods involving impregnation and the like can be used with satisfactory results.

In the dehydrogenation process utilizing this catalyst in the production of diolefins from monoolefins, alkenylpyridines from alkylpyridines or alkenyl aromatics from alkyl aromatics, the reaction is carried out at high temperature and in the presence of steam. The temperature is ordinarily in the range of 1050 to 1300° F. and the steam diluent is utilized in the amount of 1 to 30 mols of steam per mol of monoolefin or alkyl aromatic charged. It is advantageous to maintain a pressure as low as feasible, and substantially atmospheric pressure is ordinarily utilized. Elevated pressure is operable with respect to the production of the diolefins or alkenyl aromatics.

Monoolefins most commonly used in producing diolefins of the same number of carbon atoms are butenes and pentenes, butadiene and pentadiene being the products of the process. The catalyst of the invention is particularly suitable for the production of isoprene by the dehydrogenation of 2-methyl-2-butene. Also the dehydrogenation of ethylbenzene to styrene and the dehydrogenation of 2-methyl-5-ethylpyridine to 2-methyl-5-vinylpyridine are important applications of the invention. However, the process is applicable generally to making aromatic and heterocyclic substituted monoolefins and aliphatic diolefins. Suitable feeds are monoolefins of 8 or less carbon atoms and alkyl benzenes or alkylpyridines with 1 to 4 alkyl groups each having 6 or less carbon atoms with at least one alkyl group of two or more carbon atoms are most applicable from the standpoints of yield, selectivity and economics.

The process is ordinarily carried out by forming a preheated mixture of the feed and steam, passing the charge mixture over the catalyst at the desired temperature and recovering the product from the reaction mixture coming from the catalyst cases. Recycle of unconverted monoolefin is utilized in substantially all applications. The catalyst chambers may be adiabatic or isothermal though isothermal reactors are more desirable from a processing standpoint.

Example

The tabulation below shows the results obtained in several tests, including two tests for comparative purposes. The catalysts of this invention (1 to 3) were made by grinding the reagent grade fluorides together and pelleting the mixed powders to ⅛ inch pellets. The inactive packing material, catalyst 4, was also in ⅛ inch pellets. Catalyst 5 is a purchased catalyst crushed and repelleted to ⅛ inch pellets.

The tabulation gives results of runs in which 2-butene was passed over the catalysts at 400 space velocity, 12/1 ratio of steam-to-2-butene, a total pressure of one atmosphere and temperatures as shown. The figures are in mol percent. The conversion is the 2-butene converted; the yield is the once-through production of butadiene for each 100 mols of 2-butene charged; and the selectivity is the mol percent of butadiene formed from the 2-butene converted.

| Catalyst No. | Composition | 1130° F. | | | 1180° F. | | |
|---|---|---|---|---|---|---|---|
| | | Conv. | Yield | Select. | Conv. | Yield | Select. |
| 1 | 61.4FeF₃–34.6KF–4.0CrF₃ | 13.5 | 12.7 | 94.1 | 21.5 | 19.3 | 89.8 |
| 2 | 62.4FeF₃–35.2KF–2.4CrF₃ | 14.5 | 12.7 | 87.6 | 25.7 | 21.4 | 83.3 |
| 3 | 44.6FeF₃–52.2KF–3.2CrF₃ | 11.2 | 10.3 | 92.0 | 14.0 | 12.2 | 87.1 |
| 4 | Inert Packing | 1.5 | 1.4 | 93.3 | | | |
| 5 | 62.4Fe₂O₃–35.2K₂CO₃–2.4Cr₂O₃ | 23.5 | 19.8 | 84.3 | 37.2 | 29.3 | 78.8 |

Considerable crumbling and powdering of catalyst No. 5 was observed when it was removed from the reactor, far more than occurred with catalysts No. 1, 2 and 3.

While the invention has been described in connection with present, preferred embodiments thereof, it is to be understood that this description is illustrative only and is not intended to limit the invention.

I claim:

1. A method of dehydrogenating a compound from the group consisting of monoolefins, alkylpyridines and alkyl aromatics which comprise passing the vapors of said compound into contact with a catalyst consisting essentially of 10.0 to 60.0 percent by weight potassium fluoride, 89.8 to 35.0 percent by weight iron fluoride and 0.2 to 5.0 percent by weight chromium fluoride.

2. In the dehydrogenation of butenes, the steps which comprise contacting a mixture of said butenes and steam with a catalyst consisting essentially of 10.0 to 60.0 percent by weight potassium fluoride, 89.8 to 35.0 percent by weight iron fluoride and 0.2 to 5.0 percent by weight chromium fluoride.

3. In the dehydrogenation of ethylbenzene, the steps which comprise contacting a mixture of said ethylbenzene and steam with a catalyst consisting essentially of 10.0 to 60.0 percent by weight potassium fluoride, 89.8 to 35.0 percent by weight iron fluoride and 0.2 to 5.0 percent by weight chromium fluoride.

4. In the dehydrogenation of 2-methyl-5-ethylpyridine, the steps which comprise contacting a mixture of said 2-methyl-5-ethylpyridine with a catalyst consisting essentially of 10.0 to 60.0 percent by weight potassium fluoride, 89.8 to 35.0 percent by weight iron fluoride and 0.2 to 5.0 percent by weight chromium fluoride.

5. In the dehydrogenation of 2-methyl-2-butene to isoprene, the steps which comprise contacting a mixture of said 2-methyl-5-ethylpyridine with a catalyst consisting essentially of 10.0 to 60.0 percent by weight potassium fluoride, 89.8 to 35.0 percent by weight iron fluoride and 0.2 to 5.0 percent by weight chromium fluoride.

6. In the dehydrogenation of 2-methyl-2-butene, the steps which comprise contacting 2-methyl-2-butene and steam in the amount of 1 to 20 mols of steam per mol of 2-methyl-2-butene charged with a catalyst consisting essentially of 30 to 55 percent by weight potassium fluoride, 68 to 40 percent by weight iron fluoride and 2 to 5 percent by weight chromium fluoride, at a temperature within the range of 1050 to 1300° F.

7. In the dehydrogenation of butenes, the steps which comprise contacting a mixture of said butenes and steam with a catalyst consisting essentially of 30.0 to 55.0 percent by weight of postassium fluoride, 68.0 to 40.0 percent by weight iron fluoride and 2.0 to 5.0 percent by weight chromium fluoride.

8. In the dehydrogenation of ethylbenzene, the steps which comprise contacting a mixture of said ethylbenzene and steam with a catalyst consisting essentially of 30.0 to 55.0 percent by weight potassium fluoride, 68.0 to 40.0 percent by weight iron fluoride and 2.0 to 5.0 percent by weight chromium fluoride.

9. In the dehydrogenation of 2-methyl-5-ethylpyridine, the steps which comprise contacting a mixture of said 2-methyl-5-ethylpyridine with a catalyst consisting essentially of 30.0 to 55.0 percent by weight potassium fluoride, 68.0 to 40.0 percent by weight iron fluoride and 2.0 to 5.0 percent by weight chromium fluoride.

10. A method of dehydrogenating a compound selected from a group consisting of monoolefins, alkylpyridines and alkyl aromatics which comprises passing the vapors of said compound together with 1 to 20 mols of steam per part of monoolefin charged into contact with a catalyst consisting essentially of 30.0 to 55.0 percent by weight potassium fluoride, 68.0 to 40.0 percent by weight iron fluoride and 2.0 to 5.0 percent by weight chromium fluoride.

11. A catalyst consisting essentially of 34.6 percent by weight potassium fluoride, 61.4 percent by weight iron fluoride, and 4.0 percent by weight chromium fluoride.

12. A catalyst consisting essentially of 35.2 percent by weight potassium fluoride, 62.4 percent by weight iron fluoride, and 2.4 percent by weight chromium fluoride.

13. A catalyst consisting essentially of 52.2 percent by weight potassium fluoride, 44.6 percent by weight iron fluoride, and 3.2 percent by weight chromium fluoride.

14. A catalyst consisting essentially of 10.0 to 60.0 percent by weight potassium fluoride, 89.8 to 35.0 percent by weight iron fluoride, and 0.2 to 5.0 percent by weight chromium fluoride.

References Cited in the file of this patent

UNITED STATES PATENTS

| 2,154,527 | Pier et al. | Apr. 18, 1939 |
| 2,184,235 | Groll et al. | Dec. 19, 1939 |
| 2,645,605 | Hurley | July 14, 1953 |

FOREIGN PATENTS

| 452,095 | Great Britain | Aug. 7, 1936 |